Figure 1:
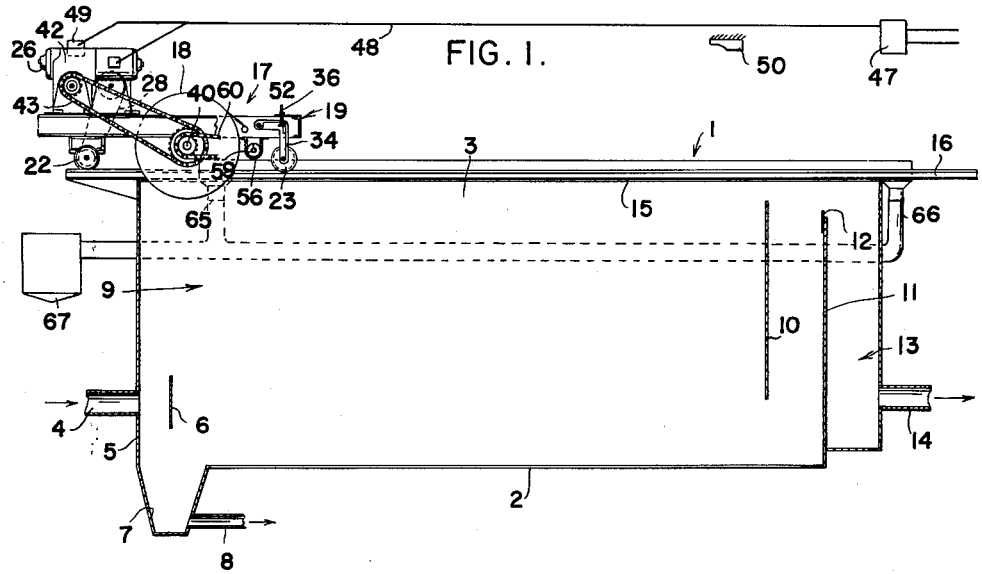

Oct. 17, 1961 W. E. CONLEY ET AL 3,004,672
APPARATUS FOR SEPARATION OF SOLIDS OR OF LIQUIDS
FROM A LIQUID BY FLOTATION
Filed June 30, 1959 3 Sheets-Sheet 3
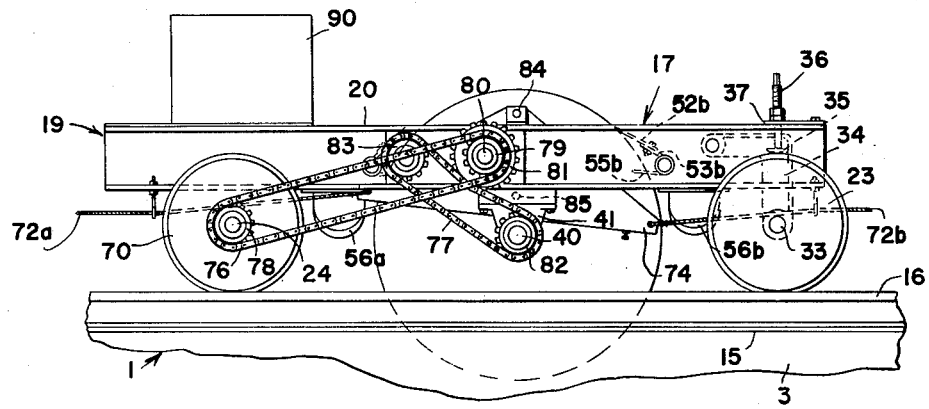
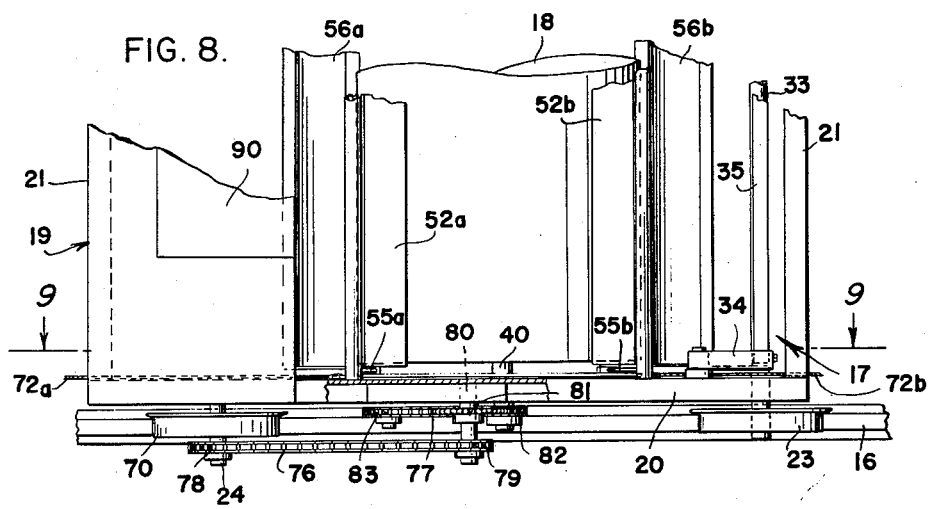
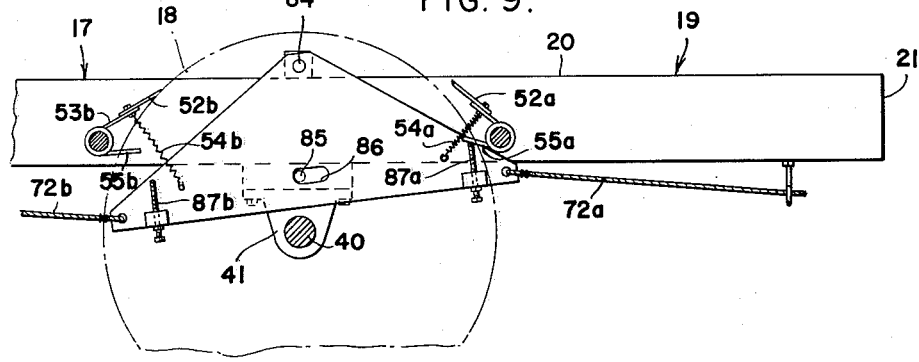

United States Patent Office 3,004,672
Patented Oct. 17, 1961

3,004,672
APPARATUS FOR SEPARATION OF SOLIDS OR OF LIQUIDS FROM A LIQUID BY FLOTATION
Weld E. Conley, Wauwatosa, William J. Katz, Fox Point, and Gilbert W. Quast, Milwaukee, Wis., assignors to Chain Belt Company, Milwaukee, Wis., a corporation of Wisconsin
Filed June 30, 1959, Ser. No. 824,045
5 Claims. (Cl. 210—525)

This invention relates to the separation of solids or of liquids from a liquid by flotation and particularly to apparatus for the removal of the scum or supernatant from the main body of the liquid.

The invention provides for the direct removal of the scum or supernatant rather than by pushing the same toward a fixed outlet. The direct removal of the scum or supernatant may be effected at predetermined intervals and the amount removed is easily and readily controlled by adjusting the operating speed and depth of the apparatus.

According to the invention, parallel horizontal rails alongside the tank support a carriage for traversing movement over the tank. The carriage rotatably carries a drum which is driven at a given peripheral speed and is supported by the carriage so that the lower-most portion of the periphery of the drum extends to or below the depth of the scum or the supernatant to be removed. A scraper or doctor blade mounted on the carriage engages the drum to remove the scum or supernatant which adheres to the drum on contact therewith. A trough extending crosswise of the carriage and having an outlet end overhanging the tank for receiving the scum or supernatant, discharges into a collecting trough extending alongside the tank.

According to the present invention, the vertical adjustment of the drum or of the carriage supporting the drum provides a readily-controlled removal of the scum or supernatant above the elevation of the lower-most point of the drum. By adjusting the height of the drum and the movement of the carriage with respect to the peripheral speed of the drum, the removal of the scum or supernatant is effected automatically at the required rate so that a given floating blanket of material is always and continuously maintained both below and above the liquid level over the entire area of the tank. Maximum separation efficiency is thus provided and is maintained automatically by reason of the fact that any increase in the rate of separation raises the general level of the blanket and submergence of the drum for a corresponding increase in removal rate, and a lowering of the separation rate lowers the general level of the blanket and decreases the submergence of the drum for a corresponding decrease in the rate of removal by the drum.

The drawings furnished herewith illustrate the best mode of carrying out the invention as presently contemplated and described hereinafter.

Figure 2:
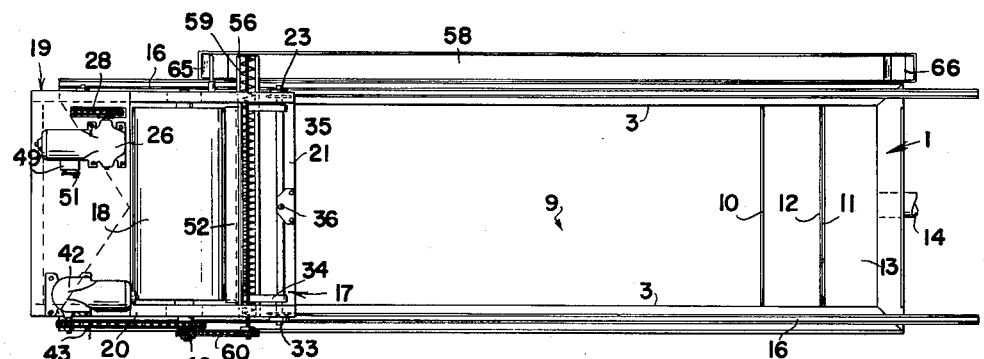
Figure 3:
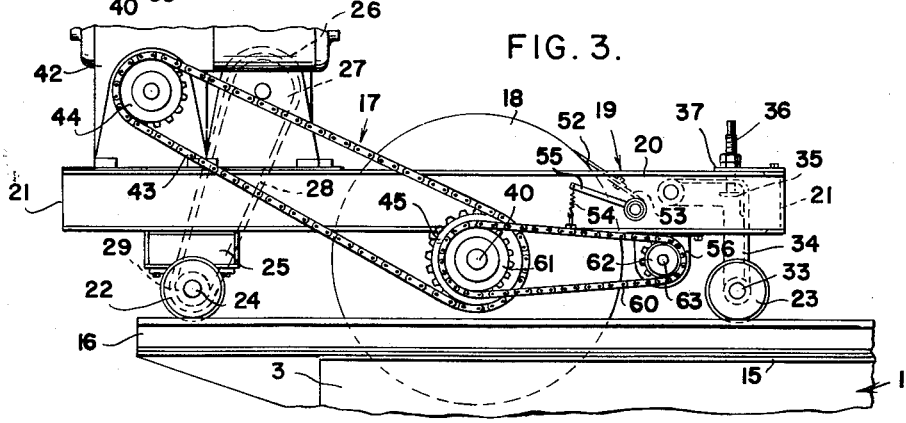
Figure 4:
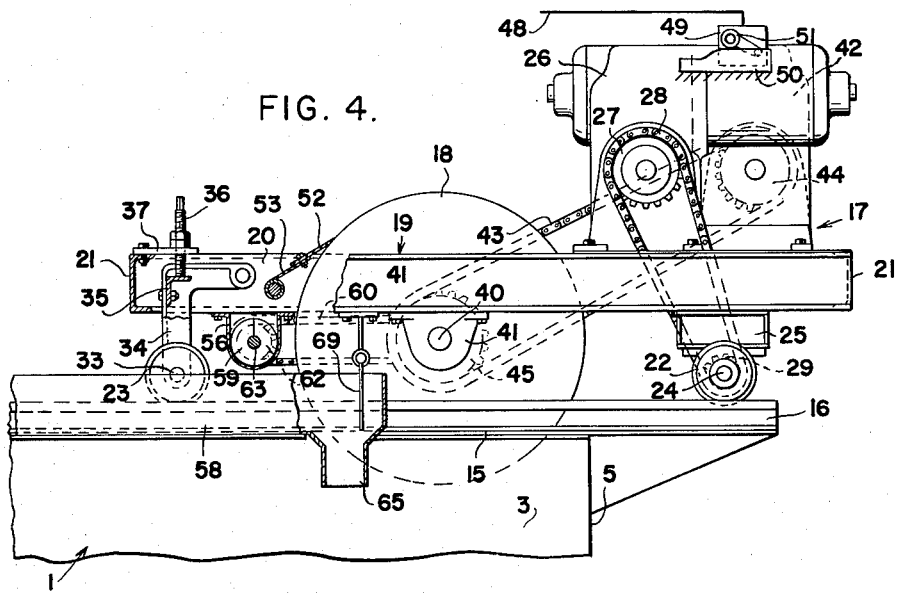
Figure 5:
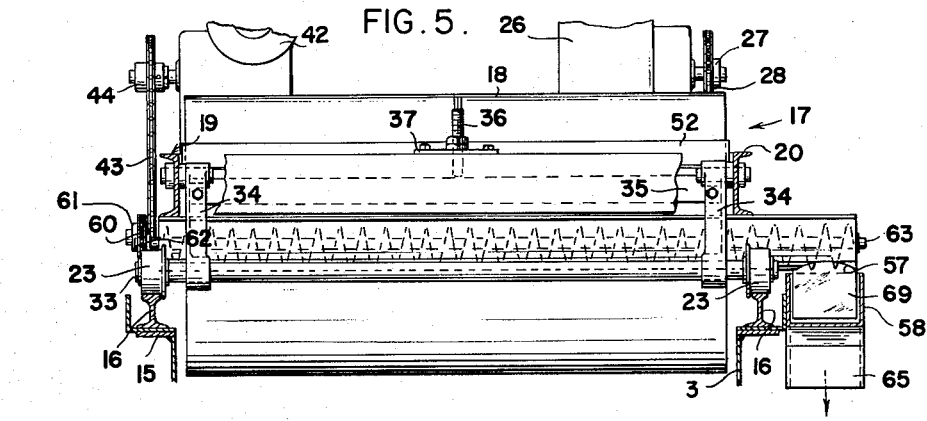
Figure 6:
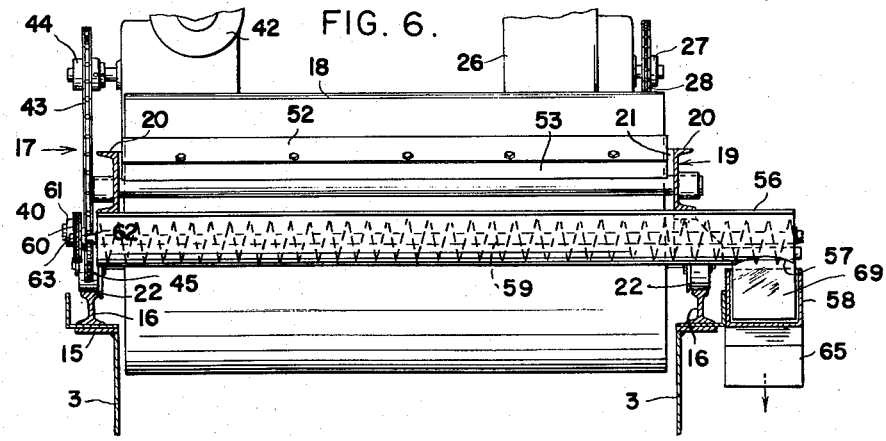

In the drawings:
FIGURE 1 is side elevation of the carriage with parts thereof broken away and sectioned and shows the tank in section;
FIGURE 2 is a plan view of the tank and carriage shown in FIGURE 1;
FIG. 3 is an enlarged side elevation of the carriage as shown in FIG. 1;
FIG. 4 is an enlarged side elevation of the opposite side of the carriage and with parts in section;
FIG. 5 is an end elevation of the carriage with parts of the frame broken away and sectioned;
FIG. 6 is a vertical cross-section of the carriage shown in FIG. 4 with the scraper or doctor blade shown in elevation;
FIG. 7 is a side elevation of a carriage driven by cables attached to the carriage;
FIG. 8 is a plan view of one side of the carriage showing the drum drive mechanism; and
FIG. 9 is a section taken on line 9—9 of FIG. 7.

The tank 1 shown in the drawings includes the bottom 2 and side walls 3. The pipe 4 for the delivery of the raw liquid opens into tank 1 through the end wall 5 and in the direction of the baffle 6 fixed within the tank. The sump 7 included in bottom 2 adjacent to wall 5, and below baffle 6 is disposed to receive and collect any heavy solids entering the tank. The periodic removal of such solids is provided for through the pipe 8 connected to the sump.

Baffle 6 is of suitable form to effect distribution of the raw flow throughout the tank cross-section and to provide a uniform flow throughout the clarification zone 9 of the tank.

Clarification zone 9 extends to the baffle 10 spaced from the outlet end wall 11 of the tank. The clarified liquid flows from zone 9 between the baffle 10 and bottom 2 of the tank and upwardly between baffle 10 and wall 11 to the weir plate 12 extending along the top of wall 11.

The elevation of weir plate 12 establishes the liquid level within tank 1 and provides the controlled discharge of the clarified liquid from the tank into the well 13. Well 13 is fixed to and includes wall 11 and discharges into delivery pipe 14 connected thereto.

The flanges 15 along the top of each side wall 3 carry the two parallel horizontal rails 16 on which the carriage 17 travels with the drum 18.

Carriage 17 includes the frame 19 comprising the longitudinal members 20 and end members 21 and the flanged wheels 22 and 23 for operation on rails 16. Wheels 22 supporting one end of carriage 17 are fixed on the corresponding ends of the axle 24 which is journalled in the bearings 25 fixed beneath and to members 20. The variable motor-reduction unit 26 mounted at one side of carriage 17 above axle 24 is provided with the drive sprocket 27 which is operatively connected by means of the chain 28 with the driven sprocket 29 fixed on axle 24 between bearings 25.

Wheels 23 supporting the other end of carriage 17 are journalled on the corresponding ends of the axle 33 which extends through the lower ends of the brackets 34. The upper ends of the brackets 34 are pivotally connected to corresponding members 20 of frame 19 and the brackets are connected by cross member 35. The vertical threaded screw 36 having one end engaging cross member 35 is threaded and supported by the extension arm 37 fixed to the adjacent cross member 21 of frame 19. Raising of the carriage is effected by turning screw 36 downwardly and turning screw 36 in the opposite direction lowers the carriage in a corresponding manner and determines the elevation of drum 18 with respect to the liquid level as maintained within the tank by weir plate 12.

Drum 18 is of structural steel having closed ends fixed on the shaft 40 between the ends of the shaft which are journalled in the corresponding bearings 41 fixed beneath and to members 20 of frame 19. Rotation of the drum 18 in the clockwise direction as viewed in FIG. 3 is effected by the variable motor-reduction unit 42 mounted at one side of the carriage opposite the drive unit 26. Motor unit 42 rotates or drives drum 18 by means of the chain 43 operating over the drive sprocket 44 of motor unit 42 and the driven sprocket 45 fixed on shaft 40 between one end of the drum 18 and the adjacent bearing 41. The intermittent operation of the drum and carriage may include one or two passes of the carriage over the tank or operation for a given specified time.

The operation of the carriage and drum at predetermined intervals is controlled by a suitable timing-switch 47, shown diagrammatically, and adapted to be suitably connected to a source of electric power. Switch 47 is connected by the flexible power line 48 directly to motor unit 42 and to the reversing switch 49 carried by motor unit 26. Switch 49 is operated by the abutments 50 disposed at each end of tank 1 to engage the cam roller 51 of the switch to reverse the operation of motor unit 26 and the direction of travel of the carriage after having reached the end of the tank.

Rotation of drum 18 and movement of carriage 17 effects the removal of the floating material contacting the drum and adhering thereto. Such material is carried by the drum to the blade or scraper 52 which comprises a semi-flexible member fixed to the plate 53 having ends pivotally carried by members 20 of frame 19. The blade 52 is held in engagement with the surface of drum 17 by the spring 54 connecting frame 19 and the lever arm 55 associated with plate 53.

The material removed from drum 18 by scraper 52 is received by the trough 56 extending crosswise of carriage 17 and beneath plate 53. One end of trough 56 extends between the wheels 22 and 23 at one side of the carriage and has an outlet opening 57 disposed above the collecting trough 58. The conveyor screw 59 operating within trough 56 is driven by motor unit 42 from shaft 40 and through the chain 60 operating over the sprockets 61 and 62 respectively mounted on shaft 40 and the shaft 63 of screw 59. The material removed from drum 18 by scraper 52 and conveyed to outlet 57 of trough 56 is received by the collecting trough 58 which extends alongside tank 1 and the full length of travel of the carriage 17.

Various means for removing the solids from the trough 58 may be provided. As shown in the drawings, the pipes 65 and 66 connect opposite ends of trough 58 with the tank 67 shown diagrammatically. The blade 69 disposed in trough 58 is carried by arm 70 projecting from frame 19 and moves with carriage 17 to push the solids in the trough to either of pipes 65 and 66. Other gravity or mechanical means for removal of the solids from trough 58 may be provided as desired and as the length of the trough allows or requires.

Drum 18 may be used to remove scum or supernatant from any given body of liquid of any size or surface area depending only on the length of the drum and travel of the carriage, provided that the drum is of an adequate diameter.

The operation of the unit requires no particular attention after initial operation is established. The critical speed of operation of the drum in every case is readily observed and the peripheral speed should not be so fast that the sludge is thrown by centrifugal force in any direction. The rotation of the drum at as slow a speed as possible is preferred to the extent that the required rate of withdrawal is maintained. The speed of the carriage should not be greater than one foot per minute and preferably less so that the direction of travel of the carriage with respect to the direction of rotation of the drum does not affect the operation of the drum. The principal factor to be regulated is the period of operation of the carriage which may be continuous if necessary. The capacity or ability to withdraw scum or supernatant should be greater than the rate of separation so that the intermittent operation of the carriage provides the most feasible regulation. The regulation referred to is readily accomplished by the suitable timing means connected to the motors driving the drum and carriage. The regulation required is readily determined merely by observing the condition of the drum in operation. If the surface of the drum is fully covered with material at all times the carriage should be operated more frequently. If the carriage is already being operated continuously the peripheral speed of the drum rather than the speed of the carriage should be increased first. However, after a given period of initial operation of the drum and carriage, it will more likely appear that the drum is operating ineffectively. The frequency of operation of the carriage should then be reduced. Generally, the drum should be operated so that its surface is on the average, one-half to two-thirds covered with solids adhering thereto. The drum should have a diameter so that its surface area is more than adequate for the required rate of removal at a speed which does not cause the material to be thrown from the drum by centrifugal force.

The drum is particularly effective in removing solids separated by air-flotation and also of greases and oils separated by flotation from the water in which they were carried. According to the relationship $C.F.=mv^2/r$, by increasing the diameter of the drum by a given factor $k$, the peripheral speed of the drum can be increased by the factor $\sqrt{k}$. The increase in speed provides a corresponding increase in drum capacity and allows a corresponding decrease in the speed of the carriage. In practice the peripheral speed of the drum can thereby be increased to the range of 100–200 ft. per minute and allows the carriage speed to be reduced to the range of 5–10 ft. per minute whereby the reversal of direction of the carriage of the drum has substantially no effect upon the operation of the drum (rotating in one direction only).

In the embodiment of the invention shown in FIGS. 7–9 the carriage 17 includes the traction wheels 70 mounted on axle 24 for operating on the rails 16. The carriage is drawn by the cables 72a and 72b having ends connecting power driven means, not shown, remote from the carriage at one or the opposite ends of rail 16 and the corresponding ends of the triangular plate 74.

The rotation of drum 18 is effected by the movement of carriage 17 through the chain drives 76 and 77. Chain 76 operates over the sprocket 78 fixed on the end of axle 24 next to one of wheels 70 and the sprocket 79 rotatably mounted on the short shaft 80 fixed to the frame member 20 of carriage 17. Sprocket 79 drives the larger sprocket 81 which is also mounted on shaft 80 and cycloidally drives chain 77. Chain 77 operates over the sprocket 82 fixed on the end of shaft 40 supporting drum 18 and the idler sprocket 83 carried by frame member 20 of carriage 17. Sprocket 81 provides rotation of drum 18 in the direction opposite the rotation of wheel 22 of the carriage and is of a larger size to provide a given increased speed over the rate of rotation of wheels 70.

Plate 74 is pivotally supported on the pin 84 and is located between one end of drum 18 and frame member 20 of carriage 17 for movement in a vertical plane to the extent allowed by the lower pin 85 extending through the slot 86 formed in the plate. The pivotal movement of the plate on pivot pin 84 occurs with each change of direction of carriage 17 as effected by cables 72a and b and serves to lower one of scrapers 52a and b against the drum and to lift the other away from the drum.

When cable 72a is drawing the carriage in one direction, plate 74 is disposed so that the adjustable screw 87a engages the arm 55a to lift scraper 52a from drum 18. The opposite end of plate 74 to which cable 72b is connected is at the same time in the lower position and increases the tension of the spring 54b connecting the plate 74 and the plate 53b carrying scraper 52b and holds the scraper against the drum to remove the material picked up by the drum. When cable 72b draws the carriage in the opposite direction, the movement of plate 74 prior to reciprocation of the carriage lowers scraper 52a and the adjustable screw 87b carried by plate 74 engages arm 55b to lift scraper 52b.

The two troughs 56a and 56b alternately receive the material collected from the drum by the corresponding scrapers 52a and b and discharge into a collecting trough, not shown.

The friction drive of wheel 70 may require the additional weight shown diagrammatically at 90 to be applied to carriage 17 above the wheels and various mechanical drives other than that shown may be employed.

The drum and carriage may operate over any distance and close control over the removal of scum or supernatant adhering to the drum is provided.

Various modes of carrying out the invention are contemplated as within the scope of the following claims particularly pointing out and distinctly claiming subject matter which is regarded as the invention.

We claim:

1. In combination with a tank having a quiescent zone for the gravity separation of a lighter material from a raw liquid, an overflow means connected to said tank for withdrawing the clarified liquid from the tank at a rate maintaining a given liquid level in said quiescent zone, parallel rails alongside the tank, a carriage having wheels engaging the track for supporting the carriage on said track and for movement over the tank, a drum rotatably supported by said carriage with the lower-most part of the drum at said given level within the tank, means for adjusting said wheels with respect to the carriage for raising and lowering the drum with respect to the liquid level in the tank, separate means for rotating said drum in one direction and moving said carriage in either direction, a scraper supported by said carriage with its upper edge in engagement with said drum, a trough fixed to said carriage beneath the lower edge of said scraper and having an outlet end projecting over the side of the tank for discharge of the scum or supernatant, a second trough extending alongside the tank and beneath the outlet end of said first trough and having outlets at each end thereof and means carried by the carriage to move therewith and disposed in said second trough to push the material therein to one of said outlets with movement of the carriage.

2. In apparatus for the gravity separation of a lighter material from a raw liquid including a tank having an overflow means connected to said tank for withdrawing the clarified liquid from the tank at a rate maintaining a given liquid level in said quiescent zone, and means for removing the scum or supernatant comprising a carriage movable lengthwise of the tank, a drum rotatably supported by said carriage with the lower-most part of the drum at said given level, means for rotating said drum in one direction and moving said carriage in either direction, a scraper supported by said carriage with its upper edge in engagement with said drum, a trough fixed to said carriage beneath the lower edge of said scraper and having an outlet end projecting over the side of the tank for discharge of the scum or supernatant, a second trough extending alongside the tank and beneath the outlet end of said first trough and having outlets at each end thereof and means carried by the carriage to move therewith and disposed in said second trough to push the material therein to one of said outlets with movement of the carriage, wherein the carriage comprises a rectangular frame supported at each end by a pair of wheels operable on parallel tracks, the drum being disposed within the frame and journally supported therefrom, and the scraper being supported between the side members of the frame and provided with a biasing spring urging the scraper against the drum.

3. In combination with a tank having a quiescent zone for the gravity separation of a lighter material from a raw liquid, an overflow means connected to said tank for withdrawing the clarified liquid from the tank at a rate maintaining a given liquid level in said quiescent zone, parallel rails alongside the tank, a carriage having wheels engaging the track for supporting the carriage on said track and for movement over the tank, a drum rotatably supported by said carriage with the lower-most part of the drum at said given level within the tank, means for adjusting said wheels with respect to the carriage for raising and lowering the drum with respect to the liquid level in the tank, separate means for rotating said drum in one direction and moving said carriage in either direction, a scraper supported by said carriage with its upper edge in engagement with said drum, a trough fixed to said carriage beneath the lower edge of said scraper and having an outlet end projecting over the side of the tank for discharge of the scum or supernatant, a second trough extending alongside the tank and beneath the outlet end of said first trough and having outlets at each end thereof and means carried by the carriage to move therewith and disposed in said second trough to push the material therein to one of said outlets with movement of the carriage, said drum being of a size so that its peripheral speed can be substantially greater than the speed of the carriage and the desired capacity of the drum can be attained within the rotational speed limits imposed by the centrifugal force developed at said speed.

4. In apparatus for the gravity separation of a lighter material from a raw liquid including a tank having an overflow means connected to said tank for withdrawing the clarified liquid from the tank at a rate maintaining a given liquid level in the quiescent zone of the tank, parallel tracks alongside said tank, a carriage including a set of wheels at each end thereof and supporting the carriage on said tracks for movement lengthwise of the tank, a drum rotatably supported by said carriage with the lower-most part of the drum in the tank at said given level, means mounted over one set of wheels at one end of the carriage for rotating said drum in at least one direction and rotating said one set of wheels to move said carriage in either direction on said tracks, a scraper supported by said carriage with its upper edge in engagement with said drum, a trough fixed to said carriage beneath the lower edge of said scraper and having an outlet end projecting over the side of the tank for discharge of the scum or supernatant, and adjustment means to raise or lower the other end of the carriage with respect to the other set of wheels for adjusting the position of the drum with respect to said given level.

5. In combination with a tank having a quiescent zone for the gravity separation of a lighter material from a raw liquid, an overflow means connected to said tank for withdrawing the clarified liquid from the tank at a rate maintaining a given liquid level in said quiescent zone, parallel rails alongside the tank, a carriage having wheels engaging the track for supporting the carriage on said track and for movement over the tank, a drum rotatably supported by said carriage with the lower-most part of the drum at said given level within the tank, said drum being of a size so that its peripheral speed can be substantially greater than the speed of the carriage and the desired capacity of the drum can be attained within the rotational speed limits imposed by the centrifugal force developed at said speed, means for adjusting said wheels with respect to the carriage for raising and lowering the drum with respect to the liquid level in the tank, separate means for rotating said drum in one direction and moving said carriage in either direction, a scraper supported by said carriage with its upper edge in engagement with said drum, a trough fixed to said carriage beneath the lower edge of said scraper and having an outlet end projecting over the side of the tank for discharge of the scum or supernatant and a second trough extending alongside the tank and beneath the outlet end of said first trough for removal of the lighter material from the tank.

References Cited in the file of this patent

UNITED STATES PATENTS

| 655,045 | Bender | July 31, 1900 |
|---|---|---|
| 1,700,791 | Elrod | Feb. 5, 1929 |
| 1,860,819 | Schamberger | May 31, 1932 |
| 2,067,277 | Miick | Jan. 12, 1937 |
| 2,337,859 | Stuller | Dec. 28, 1943 |